(12) United States Patent
Kim et al.

(10) Patent No.: US 8,816,623 B2
(45) Date of Patent: Aug. 26, 2014

(54) MOTOR CONTROLLING APPARATUS AND METHOD OF THE SAME

(75) Inventors: Mingi Kim, Seoul (KR); Jongwon Heo, Seoul (KR); Kyunghoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 653 days.

(21) Appl. No.: 13/092,032

(22) Filed: Apr. 21, 2011

(65) Prior Publication Data

US 2011/0260673 A1 Oct. 27, 2011

(30) Foreign Application Priority Data

Apr. 22, 2010 (KR) .......... 10-2010-0037118

(51) Int. Cl.
*H02K 29/06* (2006.01)
*H02P 6/00* (2006.01)
*H02P 27/08* (2006.01)
*H02P 23/00* (2006.01)

(52) U.S. Cl.
CPC ............ *H02P 27/08* (2013.01); *H02P 23/0077* (2013.01)
USPC ............ 318/400.32; 318/400.02; 318/400.05; 318/636; 318/799; 318/800; 318/811

(58) Field of Classification Search
CPC ................................................. H02P 21/0039
USPC .......... 318/400.32, 400.02, 400.05, 636, 799, 318/800, 801, 811
See application file for complete search history.

(56) References Cited

U.S. PATENT DOCUMENTS

| | | | | |
|---|---|---|---|---|
| 6,043,624 A | * | 3/2000 | Masaki et al. | 318/723 |
| 6,225,774 B1 | * | 5/2001 | Masaki et al. | 318/723 |
| 6,400,107 B1 | * | 6/2002 | Nakatani et al. | 318/400.21 |
| 6,583,593 B2 | * | 6/2003 | Iijima et al. | 318/400.32 |
| 7,064,514 B2 | * | 6/2006 | Iwaji et al. | 318/801 |
| 7,598,698 B2 | * | 10/2009 | Hashimoto et al. | 318/801 |
| 8,040,086 B2 | * | 10/2011 | Yamamoto | 318/400.02 |

FOREIGN PATENT DOCUMENTS

| | | |
|---|---|---|
| KR | 10-1994-0019055 A | 8/1994 |
| KR | 10-2003-0010480 A | 2/2003 |
| KR | 10-2003-0051223 A | 6/2003 |
| KR | 10-2006-0103552 A | 10/2006 |

* cited by examiner

*Primary Examiner* — Erick Glass
(74) *Attorney, Agent, or Firm* — McKenna Long & Aldridge, LLP

(57) ABSTRACT

Disclosed herein is a motor control apparatus and a method thereof. The operation efficiency of a compressor may be maintained by using a sensorless algorithm, sampling a current applied to a motor more than twice within a period of the triangular carrier wave for performing pulse width modulation to calculate a reference voltage, driving the motor according to the calculated reference voltage to improve control resolution, and performing a high-speed operation while reducing a volume of the compressor, without adding a separate hardware when controlling the operation of the motor provided in the compressor at a high speed.

11 Claims, 4 Drawing Sheets

MOTOR CONTROLLING APPARATUS AND METHOD OF THE SAME

CROSS-REFERENCE TO RELATED APPLICATIONS

Pursuant to 35 U.S.C. §119(a), this application claims the benefit of earlier filing date and right of priority to Korean Application No. 10-2010-0037118 filed on Apr. 22, 2010, the contents of which are incorporated by reference herein in its entirety.

BACKGROUND OF THE INVENTION

1. Field of the Invention

The present invention relates to an apparatus for controlling a motor, and more particularly, to a motor control apparatus for stably controlling a motor without adding a separate hardware when operating the motor at a high speed, and a method of the same.

2. Background of the Invention

Motors provided in a compressor typically do not include a sensor due to the difficulty of its installation. Accordingly, a control apparatus for driving the motor drives the motor using a sensorless algorithm. The sensorless algorithm calculates the position of a rotor to allow the user to drive the motor at his or her desired speed. A motor control apparatus according to the related art may be operated up to a predetermined machine speed, for example, 120 Hz (hereinafter, normal operation), using this sensorless algorithm, but high-speed operation, for example, 150 Hz, is required to enhance the performance of a compressor.

In order to operate a motor at a high speed, the stability of control should be secured and load responsiveness should be enhanced (hereinafter, control resolution). If the speed of a motor is increased, then there is a problem that the sampling period is shortened, and the sampling number of a current applied to the motor is reduced from 21 to 17 when increasing the speed with a control algorithm driven during normal operation and thus the control resolution should be increased.

In a motor control apparatus according to the related art, carrier frequency is increased to improve control resolution. However, the method of increasing carrier frequency increases control resolution, but has a problem of increasing the number of switching, thereby causing switching loss.

SUMMARY OF THE INVENTION

The present invention is contrived to solve the foregoing problem, and an aspect of the present invention is to provide a motor control apparatus for enhancing control resolution without adding a separate hardware when controlling a motor at a high speed, and a method thereof.

In controlling a motor using a sensorless algorithm, another aspect of the present invention is to provide a motor control apparatus for sampling a current applied to a motor more than twice within a period of the triangular carrier wave for performing pulse width modulation (PWM) to generate a reference voltage when controlling the motor at a high speed, and a method thereof.

In order to accomplish the foregoing objective, a motor control apparatus according to the present disclosure may include an inverter configured to apply a motor driving voltage to a motor based on a control signal, a current detection unit provided between the inverter and the motor to detect a motor driving current applied to the motor, and a control unit configured to calculate a reference voltage based on the motor driving current and a reference motor speed, and generate the control signal based on the reference voltage and a triangular carrier wave to output to the inverter, wherein the control unit calculates the reference voltage more than twice within a period of the triangular carrier wave.

In a motor control apparatus according to the present disclosure, the control unit may include a calculation unit configured to calculate a speed of the motor based on the motor driving current, a speed controller configured to receive the reference motor speed and the calculated motor speed and to generate a reference current based on the reference motor speed and the calculated motor speed, a current controller configured to receive the reference current and a detection current and to generate the reference voltage based on the reference current and the detection current, and a pulse width modulation controller configured to compare the triangular carrier wave with the reference voltage and to generate the control signal according to the comparison result. Furthermore, the control unit may calculate the reference voltage when a value of the triangular carrier wave is underflow and overflow.

In a motor control apparatus according to the present disclosure, the current detection unit may be a current transducer connected between the inverter and the motor to continuously detect the motor driving current.

In order to accomplish the foregoing objective, a control method of a motor control apparatus according to the present disclosure may include detecting a motor driving current applied to the motor, receiving a reference motor speed, calculating the reference voltage based on the motor driving current and the reference motor speed, generating a control signal based on the reference voltage and triangular carrier wave, and outputting the control signal to the inverter, wherein said calculating the reference voltage calculates the reference voltage twice or more within a period of the triangular carrier wave.

In a control method of a motor control apparatus according to the present disclosure, said calculating the reference voltage may include calculating a speed of the motor, calculating a reference current based on the reference motor speed and the calculated speed, and calculating the reference voltage based on the to reference current and the detection current. Furthermore, said generating the control signal may include comparing the triangular carrier wave with the reference voltage, wherein the control signal is generated according to the comparison result.

In a motor control apparatus and a method thereof according to the present disclosure, it may be possible to enhance control resolution and improve the stability of a system by using a modified sensorless algorithm without adding a separate hardware when controlling the operation of a motor at a high speed.

In controlling a motor using a sensorless algorithm according to the present disclosure, it may be possible to improve control resolution by sampling a current applied the motor more than twice within a period of the triangular carrier wave for performing pulse width modulation to calculate a reference voltage, and driving the motor according to the calculated reference voltage when controlling the operation of a motor at a high speed.

According to the present disclosure, the operation efficiency of a compressor may be maintained by performing a high-speed operation while reducing a volume of the compressor.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a motor control apparatus and method thereof according to the present disclosure will be described in detail with reference to the accompanying drawings.

Figure 1:
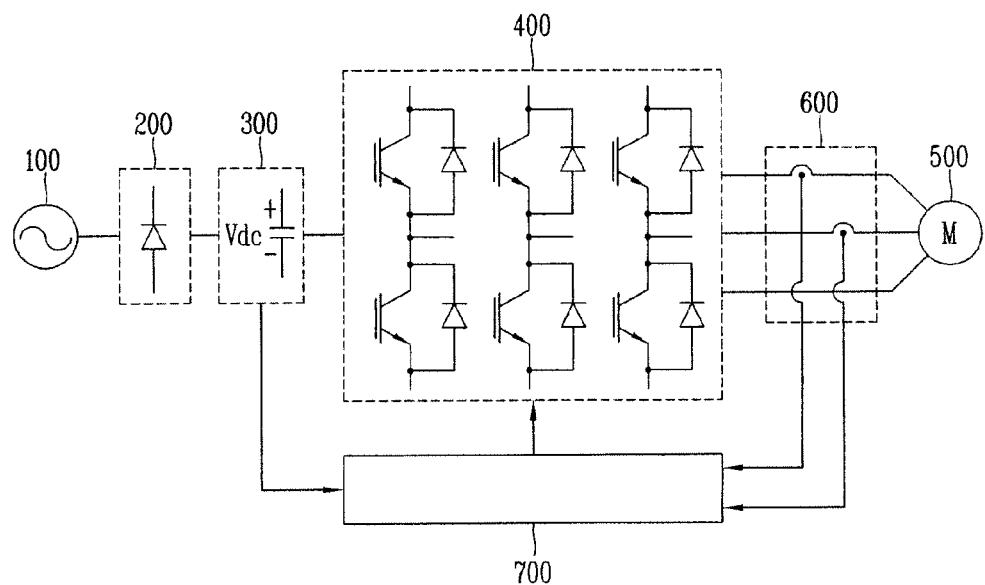
FIG. 1 is a block diagram schematically illustrating the configuration of a to typical motor control apparatus to be applied to the present invention.

FIG. 1 is a view schematically illustrating the configuration of a typical motor control apparatus, and the motor control apparatus may include a converter 200 configured to convert an alternating-current voltage 100 to a direct-current voltage, a smoothing unit 300 configured to smooth the direct-current voltage, an inverter 400 configured to convert the smoothed direct-current voltage to apply a motor driving voltage to a motor 500, a current detection unit 600 configured to detect a motor driving current applied to the motor 500, and a control unit 700 configured to output a control signal to the inverter 400 to drive the motor 500.

In a motor control apparatus according to the present disclosure, the control unit 700 calculates the reference voltage based on the motor driving current and reference motor speed, and generates the control signal based on the reference voltage and triangular carrier wave to output to the inverter 400. Furthermore, the control unit 700 samples the motor driving current more than twice within a period of the triangular carrier wave, and calculates the reference voltage according to the sampling timing.

Figure 2:
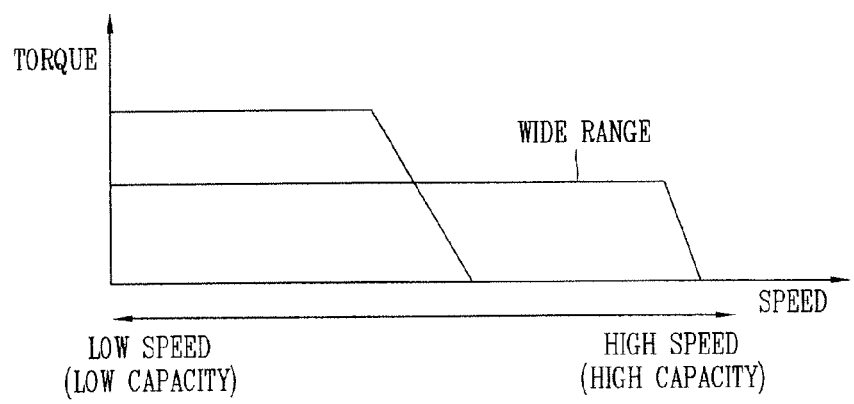
FIG. 2 is a view illustrating the change of a torque output according to motor speed variation in FIG. 1.

As illustrated in FIG. 2, the motor provided in a compressor should be operated at a high speed to maintain the efficiency of the compressor while reducing a volume of the compressor. For example, in case of an air handling unit, it may be applicable to a large volume of indoor unit when performing a high-speed operation.

The current detection unit 600 is a current transducer connected between the inverter 400 and the motor 500 to continuously detect the motor driving current. The current transducer detects the motor driving current and converts it into a voltage signal to output to the control unit 700. Furthermore, the current transducer detects the motor driving current during the overall interval of pulse width modulation. For example, in case of a three-phase brushless DC (BLDC) motor, the current detection unit 600 detects two phases (iu, iv) of a current applied thereto in three phases to output to the control unit 700. The control unit 700 generates an interrupt signal to sample a voltage signal according to the detected motor driving current.

Figure 3:
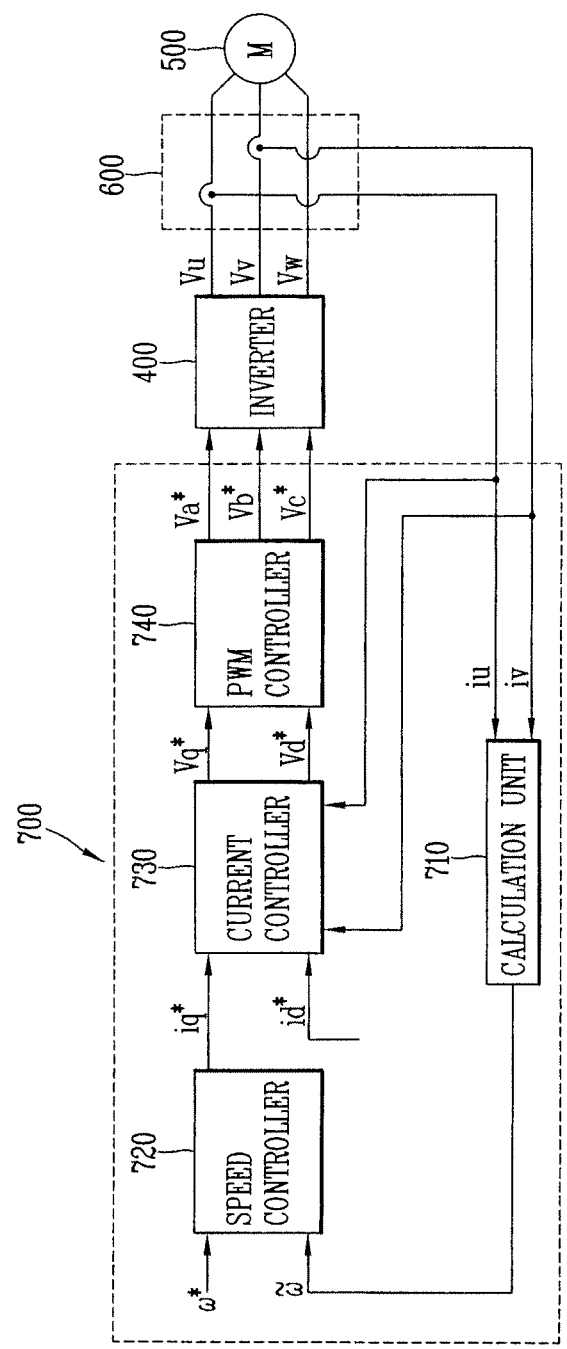
FIG. 3 is a block diagram schematically illustrating the configuration of a motor control apparatus according to the present disclosure.

Referring to FIG. 3, in a motor control apparatus according to the present disclosure, the control unit 700 may include a calculation unit 710 configured to calculate a speed of the motor based on the motor driving current, a speed controller 720 configured to receive the reference motor speed and the calculated motor speed and to generate a reference current based on the reference motor speed and the calculated motor speed, a current controller 730 configured to is receive the reference current and a detection current and to generate the reference voltage based on the reference current and the detection current, and a pulse width modulation controller 740 configured to compare the triangular carrier wave with the reference voltage and to generate the control signal according to the comparison result.

The calculation unit 710 receives a motor driving current detected by the current detection unit 600, and calculates and estimates the speed ($\omega$) of the motor and the position of a rotor provided in the motor using a sensorless algorithm.

The speed controller 720 may include a comparator (not shown) for comparing the user's desired reference motor speed ($\omega^*$) with the speed estimated and calculated by the calculation unit 710, and a first proportional integral (PI) controller (not shown), and receives the reference motor speed and the calculated speed and proportionally integrates a difference between the reference motor speed and the calculated speed, namely, a speed error, to generate a q-axis reference current ($i^*_q$), and output it to the current controller 730.

The current controller 730 receives a q-axis reference current and a d-axis reference current ($i^*_d$) generated by the speed controller 720 to generate and output a reference voltage. The current controller 730 allows a q-axis reference current to be passed through a second proportional integral controller and a filter to and outputs a q-axis reference voltage ($V^*_q$) to the pulse width modulation controller 740. In other words, the current controller 730 compares the q-axis reference current with the q-axis calculated current ($i_q$) for which a motor driving current detected through the current detection unit 600 is axially translated, and allows a difference therebetween, namely, a current error, to be passed through a is second proportional integral controller and a filter and outputs a q-axis reference voltage ($V^*_q$) to the pulse width modulation controller 740. On the other hand, the current controller 730 allows a d-axis reference current to be passed through a third proportional integral controller and a filter and outputs a d-axis reference voltage ($V^*_d$) to the pulse width modulation controller 740. In other words, the current controller 730 compares the d-axis reference current with the d-axis calculated current ($i_d$) for which a motor driving current detected through the current detection unit 600 is axially translated, and allows a difference therebetween, namely, a current error, to be passed through a third proportional integral controller and a filter and outputs a d-axis reference voltage ($V^*_d$) to the pulse width modulation controller 740.

The pulse width modulation controller 740, first, axially translates a reference voltage of the synchronous coordinate system to a reference voltage of the stationary coordinate system ($\alpha$, $\beta$). In other words, the pulse width modulation controller 740 transforms ($V^*_d$, $V^*_q$) into ($V^*_\alpha$, $V^*_{62}$). Furthermore, the pulse width modulation controller 740 converts and outputs a reference voltage of the stationary coordinate system to be matched to a motor form to be driven. For example, in case of a three-phase brushless DC (BLDG) motor, the pulse width modulation controller 740 converts a reference voltage of the stationary coordinate system into a reference voltage ($V^*_a$, $V^*_b$, $V^*_c$) in three phases to output to the inverter 400.

Figure 4:
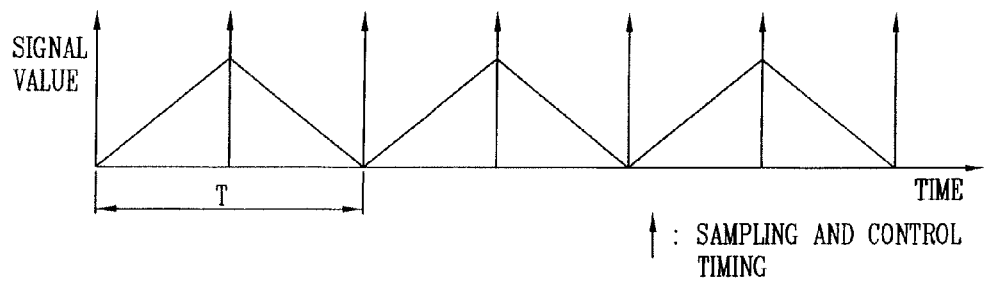
FIG. 4 is a view for explaining the operation of sampling a motor driving current over twice during a period of the triangular carrier wave in a motor control apparatus according to the present disclosure.

Referring to FIG. 4, the control unit 700 samples the motor driving current when a value of the triangular carrier wave is underflow and overflow, and performs a control algorithm from the sampling timing to calculate a reference voltage. At this time, the reference voltage may be calculated similarly within a is period of the triangular carrier wave, or may have a different value for each calculation.

Figure 5:
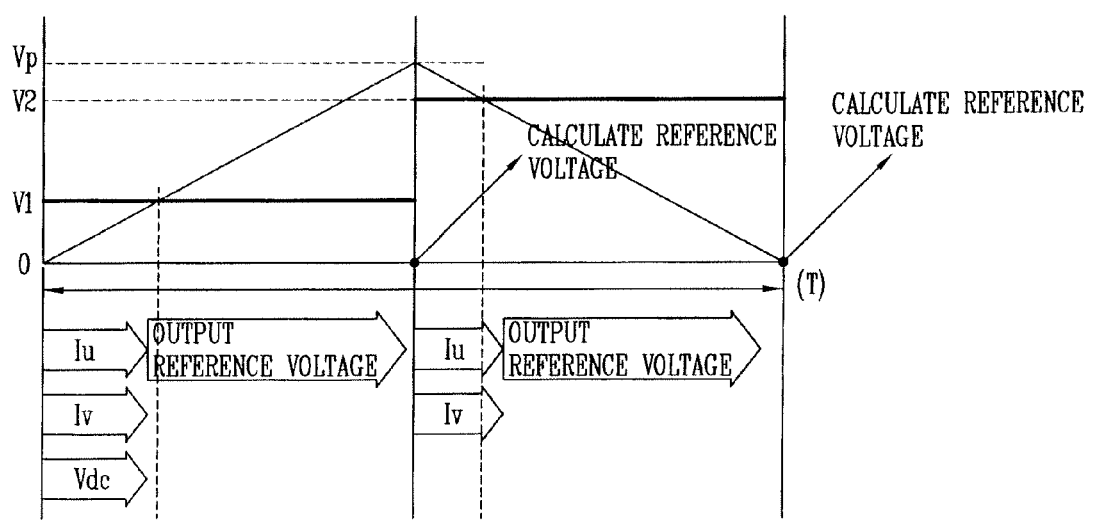
FIG. 5 is a view for explaining the operation of sampling a motor driving current twice to calculate a reference voltage according to the present disclosure.

The operation of calculating a reference voltage of the motor control apparatus according to the present disclosure to output a control signal to the inverter will be described with reference to FIG. 5.

The motor control apparatus according to the present disclosure converts a reference voltage ($V^*_d$, $V^*_q$) of the synchronous coordinate system outputted from the current controller 730 through the pulse width modulation controller 740 into a reference voltage ($V^*_\alpha$, $V^*_\beta$) of the stationary coordinate system to have a reference voltage matched to a motor form. For example, in case of converting into a reference voltage ($V^*_a$, $V^*_b$, $V^*_c$) in three phases, a triangular carrier wave for pulse width modulation with respect to each phase is compared with a reference voltage value with respect to each phase, and a control signal that is pulse width modulated based on the comparison result is outputted to the inverter. The reference voltage value is stored in a compare register within the control unit. In case where the inverter is comprised of a switching element such as MOSFET, the control signal becomes a gating signal. At this time, if the motor driving current is sampled when a value of the triangular carrier wave is underflow and overflow, then the control unit implements a sensorless algorithm from each sampling timing to generate a reference voltage. At this time, the reference voltage value may be determined differently as V1 and V2 according to the reference motor speed as illustrated in FIG. 5. Of course, the reference voltage value may be determined as the same value. Accordingly, asymmetric pulse width modulation may be enabled.

Figure 6:
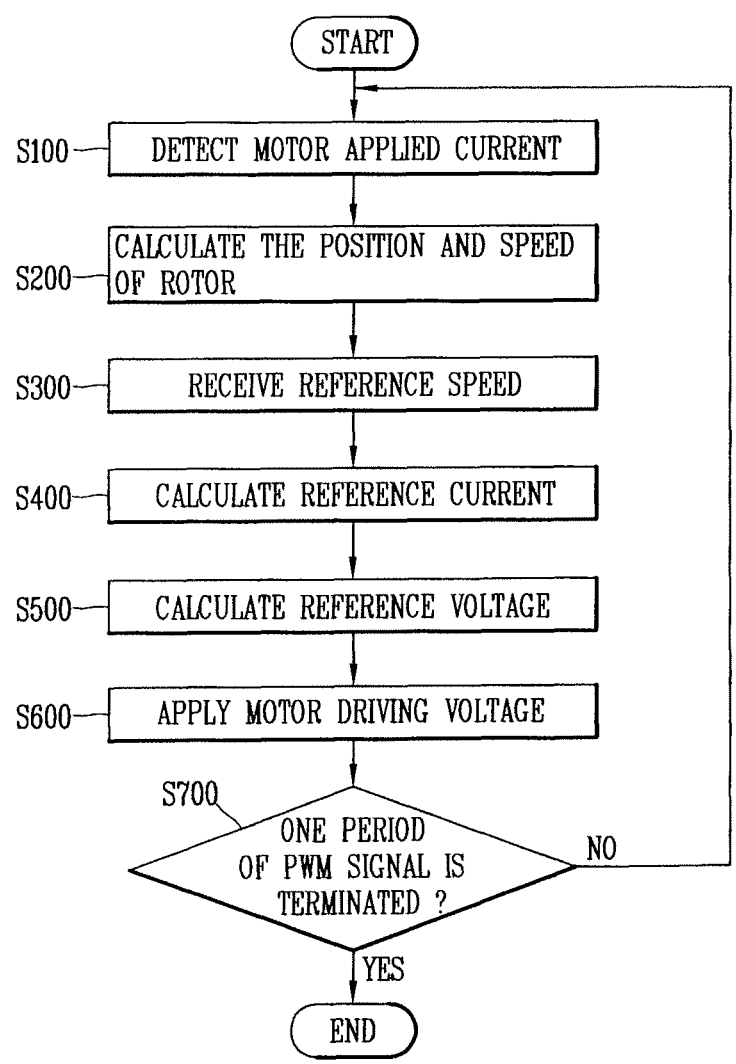
FIG. 6 is a flow chart schematically illustrating a control method of a motor control apparatus according to the present disclosure.

Referring to FIG. 6, in a control method of a motor control apparatus according to the present disclosure, the motor control apparatus is provided with a converter configured to convert an alternating-current voltage to a direct-current voltage, a smoothing unit configured to smooth the direct-current voltage, and an inverter configured to convert the smoothed direct-current voltage to apply a motor driving voltage to a motor, and the method may include detecting a motor driving current applied to the motor (S100), receiving a reference motor speed (S300), calculating the reference voltage based on the motor driving current and the reference motor speed (S500), generating a control signal based on the reference voltage and triangular carrier wave (not shown), and outputting the control signal to the inverter (S600), wherein said calculating the reference voltage (S500) calculates the reference voltage twice or more within a period of the triangular carrier wave. In other words, said calculating the reference voltage (S500) samples a motor driving current more than twice within a period of the carrier signal of the triangular carrier wave, and implements a sensorless control algorithm at the sampling timing to calculate a reference voltage.

Said calculating the reference voltage (S500) may include calculating a speed of the motor (S200), calculating a reference current based on the reference motor speed and the calculated speed (S300), and calculates the reference voltage based on the reference current and the detection current.

Here, said generating the control signal may include comparing the triangular carrier wave with the reference voltage, and the control signal is generated according to the comparison result. Hereinafter, the configuration of the apparatus will be described with reference to FIGS. 1 through 5.

The motor control apparatus detects a motor driving current applied to the motor using a current detection unit (S100), and estimates and calculates the speed of the motor and the position of a rotor using the detected motor driving is current (S200). Here, for the current detection unit, a current transducer connected between the inverter and the motor may be preferably used to continuously detect the motor driving current. The current transducer detects the motor driving current and converts it into a voltage signal to output to the control unit, and detects the motor driving current during the overall interval of pulse width modulation. For example, in case of a three-phase brushless DC (BLDG) motor, the current detection unit detects two phases (iu, iv) of a current applied thereto in three phases to output to an calculation unit of the control unit, and the calculation unit estimates and calculates the speed of the motor and the position of a rotor using a sensorless algorithm therefrom (S200). The circuit unit generates an interrupt signal to sample a voltage signal according to the detected motor driving current. Referring to FIG. 4, the control unit samples the motor driving current when a value of the triangular carrier wave is underflow and overflow, and performs a control algorithm from the sampling timing to calculate a reference voltage. At this time, the reference voltage may be calculated similarly within a period of the triangular carrier wave, or may have a different value for each calculation.

The speed controller receives or calculates the user's desired reference motor speed, and receives the reference motor speed and the calculated speed and proportionally integrates a difference between the reference motor speed and the calculated speed, namely, a speed error, to calculate a q-axis reference to current (S400). The current controller receives a q-axis reference current and a d-axis reference current to generate and output a reference voltage (S500). The current controller compares the q-axis reference current with the q-axis calculated current for which a motor driving current is axially translated, and allows a difference therebetween, namely, a current error, to be passed through a second is proportional integral controller and a filter and calculates a q-axis reference voltage, and compares the d-axis reference current with the d-axis calculated current for which a motor driving current is axially translated, and allows a difference therebetween, namely, a current error, to be passed through a third proportional integral controller and a filter and calculates a d-axis reference voltage (S500). The pulse width modulation controller axially translates a reference voltage of the synchronous coordinate system to a reference voltage of the stationary coordinate system ($\alpha$, $\beta$). Furthermore, the pulse width modulation controller converts and outputs a reference voltage of the stationary coordinate system to be matched to a motor form to be driven. For example, in case of a three-phase brushless DC (BLDC) motor, the pulse width modulation controller converts a reference voltage of the stationary coordinate system into a reference voltage in three phases to output to the inverter. Referring to FIG. 5, the control apparatus converts a reference voltage of the synchronous coordinate system into a reference voltage of the stationary coordinate system, and converts it into a reference voltage, for example, a reference voltage in three phases, matched to a motor form. The control apparatus compares a triangular carrier wave for pulse width modulation with respect to each phase with a reference voltage value with respect to each phase, and outputs a control signal that is pulse width modulated based on the comparison result to the inverter. The reference voltage value is stored in a compare register within the control unit. In case where the inverter is comprised of a switching element such as MOSFET, the control signal becomes a gating signal. At this time, if the motor driving current is sampled when a value of the triangular carrier wave is underflow and overflow, then the control unit implements a sensorless algorithm from each sampling timing to generate a is reference voltage. At this time, the reference voltage value may be determined differently as V1 and V2 according to the reference motor speed as illustrated in FIG. 5. Accordingly, asymmetric pulse width modulation may be enabled. Of course, the reference voltage value may be determined as the same value.

As described above, according to a motor control apparatus and a method thereof, the operation efficiency of a compressor may be maintained by using a sensorless algorithm, sampling a current applied to a motor more than twice within a period of the triangular carrier wave for performing pulse width modulation to calculate a reference voltage, driving the motor according to the calculated reference voltage to improve control resolution, and performing a high-speed operation while reducing a volume of the compressor, without adding a separate hardware when controlling the operation of the motor provided in the compressor at a high speed.

What is claimed is:

1. A motor control apparatus, comprising:
   an inverter configured to apply a motor driving voltage to a motor based on a control signal;
   a current detection unit provided between the inverter and the motor to detect a motor driving current applied to the motor; and
   a control unit configured to calculate a reference voltage based on the motor driving current and a reference motor speed, to generate the control signal based on the reference voltage and a triangular carrier wave, and to output the control signal to the inverter, wherein the control unit samples the motor driving current more than twice within a period of the triangular carrier wave and calculates the reference voltage based on the sampled motor driving current more than twice within a period of the triangular carrier wave.

2. The motor control apparatus of claim 1, wherein the control unit comprises:
   a calculation unit configured to calculate a speed of the motor based on the motor driving current;
   a speed controller configured to receive the reference motor speed and the calculated motor speed and to generate a reference current based on the reference motor speed and the calculated motor speed;
   a current controller configured to receive the reference current and a detection current and to generate the reference voltage based on the reference current and the detection current; and
   a pulse width modulation controller configured to compare the triangular carrier wave with the reference voltage and to generate the control signal according to the comparison result.

3. The motor control apparatus of claim 2, wherein the control unit calculates the reference voltage when a value of the triangular carrier wave is underflow and overflow.

4. The motor control apparatus of claim 3, wherein the reference voltage has a different value for each calculation.

5. The motor control apparatus of claim 1, wherein the current detection unit is a current transducer connected between the inverter and the motor to continuously detect the motor driving current.

6. A control method of a motor control apparatus provided with a converter configured to convert an alternating-current voltage to a direct-current voltage, a smoothing unit configured to smooth the direct-current voltage, and an inverter configured to convert the smoothed direct-current voltage to apply a motor driving voltage to a motor, the method comprising:
   detecting a motor driving current applied to the motor;
   sampling the motor driving current twice or more within a period of the triangular carrier wave;
   receiving a reference motor speed;
   calculating a reference voltage based on the sampled motor driving current and the reference motor speed;
   generating a control signal based on the reference voltage and a triangular carrier wave; and
   outputting the control signal to the inverter, wherein the reference voltage is calculated twice or more within a period of the triangular carrier wave.

7. The method of claim 6, wherein said calculating the reference voltage comprises:
   calculating a speed of the motor;
   calculating a reference current based on the reference motor speed and the calculated motor speed; and
   calculating the reference voltage based on the reference current and a detection current.

8. The method of claim 7, wherein said generating the control signal comprises: comparing the triangular carrier wave with the reference voltage, wherein the control signal is generated according to the comparison result.

9. The method of claim 6, wherein said calculating the reference voltage calculates the reference voltage when a value of the triangular carrier wave is underflow and overflow.

10. A motor control apparatus, comprising:
    a converter configured to covert an alternating-current voltage to a direct-current voltage;
    a smoothing unit configured to smooth the direct-current voltage;
    an inverter configured to convert the smoothed direct-current voltage to apply a motor driving voltage to a motor;
    a current detection unit configured to detect a motor driving current applied to the motor; and
    a control unit configured to sample the motor driving current when a triangular carrier wave is underflow and overflow within a period of the triangular carrier wave and calculate a reference voltage when a triangular carrier wave is underflow and overflow within a period of the triangular carrier wave based on the sampled motor driving current and a reference motor speed and to generate a control signal based on the reference voltage and the triangular carrier wave.

11. The motor control apparatus of claim 10, wherein the reference voltage has a different value for each calculation.

* * * * *